US00RE41396E

(19) United States
(12) Reissued Patent
Clark et al.

(10) Patent Number: US RE41,396 E
(45) Date of Reissued Patent: Jun. 22, 2010

(54) METHOD AND SYSTEM FOR ENTERING AND DISPLAYING GROUND TAXI INSTRUCTIONS

(75) Inventors: Samuel T. Clark, Federal Way, WA (US); Wayne R. Jones, Bellevue, WA (US); Michael P. Snow, Langley, WA (US); Eddie J. Trujillo, Snohamish, WA (US)

(73) Assignee: The Boeing Company, Chicago, IL (US)

(21) Appl. No.: 12/139,416

(22) Filed: Jun. 13, 2008

Related U.S. Patent Documents

Reissue of:
(64) Patent No.: 7,222,017
Issued: May 22, 2007
Appl. No.: 10/870,630
Filed: Jun. 17, 2004

(51) Int. Cl.
*G08G 5/06* (2006.01)
*G06F 19/00* (2006.01)

(52) U.S. Cl. ..... 701/120; 701/10; 701/14; 340/958; 340/972

(58) Field of Classification Search ..... 701/120, 701/119, 3, 10, 14, 122; 340/945, 909, 958, 340/961, 972, 521, 959; 345/660
See application file for complete search history.

(56) References Cited

U.S. PATENT DOCUMENTS

| | | | |
|---|---|---|---|
| 3,696,671 | A | 10/1972 | Steigleder et al. |
| 4,147,056 | A | 4/1979 | Muller |
| 4,196,474 | A | 4/1980 | Buchanan et al. |
| 4,631,678 | A | 12/1986 | Angermuller et al. |
| 4,642,775 | A | 2/1987 | Cline et al. |
| 4,792,906 | A | 12/1988 | King et al. |
| 4,939,661 | A | 7/1990 | Barker et al. |
| 5,243,339 | A | 9/1993 | Graham et al. |
| 5,289,185 | A | 2/1994 | Ramier et al. |
| 5,329,277 | A | 7/1994 | Dougan et al. |
| 5,343,395 | A | 8/1994 | Watts |
| 5,475,594 | A | 12/1995 | Oder et al. |
| 5,519,392 | A | 5/1996 | Oder et al. |
| 5,519,618 | A | 5/1996 | Kastner et al. |
| 5,592,198 | A | 1/1997 | Fagard et al. |
| 5,593,114 | A | 1/1997 | Ruhl |
| 5,629,691 | A | 5/1997 | Jain |
| 5,715,163 | A | 2/1998 | Bang et al. |

(Continued)

FOREIGN PATENT DOCUMENTS

| | | |
|---|---|---|
| DE | 4140406 | 6/1993 |
| WO | WO-0224530 | 3/2002 |

OTHER PUBLICATIONS

Hooey et al., "Integrating datalink andcockpit display technologies into current and future taxi operations," Digital Avionics Systems Conferences, V2, 8 pages (2000).

(Continued)

*Primary Examiner*—Tan Q. Nguyen
(74) *Attorney, Agent, or Firm*—Perkins Coie LLP

(57) ABSTRACT

A system and method are provided for the efficient entry and display of ground taxi routes on an electronic airport map display. The system may include a touchscreen entry device, a display device, a computer, a map database, a vehicle position sensor and a transmitter/receiver. The system may be configured to check the ground taxi entries to ensure that each successive segment is contiguous with the last or next segment, and any gaps or discontinuities in the displayed taxi instructions may be annunciated. An intelligent display of next possible segments may be incorporated into the system.

20 Claims, 6 Drawing Sheets

U.S. PATENT DOCUMENTS 5,736,955 A 4/1998 Roif
5,802,492 A 9/1998 DeLorme et al.
5,825,306 A 10/1998 Hiyokawa et al.
5,884,219 A 3/1999 Curtwright et al.
5,941,930 A 8/1999 Morimoto et al.
5,978,715 A 11/1999 Briffe et al.
5,983,158 A 11/1999 Suzuki et al.
5,995,901 A 11/1999 Owen et al.
6,067,502 A 5/2000 Hayashida et al.
6,075,467 A 6/2000 Ninagawa et al.
6,112,141 A 8/2000 Briffe et al.
6,163,309 A 12/2000 Weinert
6,181,987 B1 1/2001 Deker et al.
6,199,015 B1 3/2001 Curtwright et al.
6,246,342 B1 6/2001 Vandevoorde et al.
6,289,277 B1 9/2001 Feyereisen et al.
6,313,759 B1 11/2001 Musland-Sipper
6,314,363 B1 11/2001 Pilley et al.
6,314,370 B1 11/2001 Curtright
6,362,750 B1 3/2002 Castor et al.
6,381,538 B1 4/2002 Robinson et al.
6,405,975 B1 6/2002 Sankrithi et al.
6,424,909 B2 7/2002 Kusano et al.
6,449,556 B1 9/2002 Pauly
6,462,697 B1 10/2002 Klamer et al.
6,512,527 B1 1/2003 Barber et al.
6,542,796 B1 4/2003 Gibbs et al.
6,545,601 B1 4/2003 Monroe
6,553,307 B2 4/2003 Stratton et al.
6,571,166 B1 5/2003 Johnson et al.
6,606,563 B2 8/2003 Corcoran, III
6,633,810 B1 10/2003 Qureshi et al.
6,690,299 B1 2/2004 Suiter
6,694,249 B1 2/2004 Anderson et al.
6,707,475 B1 3/2004 Snyder
6,711,475 B2 3/2004 Murphy et al.
6,721,640 B2 4/2004 Glenn et al.
6,745,113 B2 6/2004 Griffin, III et al.
6,751,545 B2 6/2004 Walter
6,753,891 B1 6/2004 Chohan et al.
6,789,010 B2 9/2004 Walter
6,812,858 B2 11/2004 Griffin, III
6,816,780 B2 11/2004 Naimer et al.
6,856,864 B1 2/2005 Gibbs et al.
6,862,519 B2 3/2005 Walter
6,871,124 B1 3/2005 McElreath
6,898,492 B2 5/2005 De Leon et al.
6,909,967 B2 6/2005 Hirano et al.
6,957,130 B1 10/2005 Horvath et al.
6,980,198 B1 12/2005 Gyde et al.
6,992,596 B2 1/2006 Cole et al.
6,992,597 B2 1/2006 Rogers et al.
7,030,892 B1 4/2006 Gyde et al.
7,039,505 B1 * 5/2006 Southard et al. ..... 701/3
7,049,953 B2 * 5/2006 Monroe ..... 340/521
7,142,131 B2 11/2006 Sikora
7,148,814 B2 12/2006 Sikora et al.
7,177,731 B2 2/2007 Sandell et al.
7,188,007 B2 3/2007 Boorman et al.
7,203,577 B2 4/2007 Gunn et al.
7,230,632 B2 6/2007 Coldefy et al.
7,256,710 B2 8/2007 Mumaw et al.
7,345,693 B2 3/2008 Coldefy et al.
2002/0099528 A1 7/2002 Hett
2002/0120392 A1 8/2002 Stratton et al.
2003/0009278 A1 1/2003 Mallet et al.
2003/0045994 A1 3/2003 Stratton et al.
2004/0006412 A1 1/2004 Doose et al.
2004/0059474 A1 3/2004 Boorman et al.
2004/0059497 A1 * 3/2004 Sankrithi ..... 701/120
2005/0090969 A1 * 4/2005 Siok et al. ..... 701/120
2005/0143871 A1 6/2005 Boorman et al.
2005/0178903 A1 8/2005 Boorman et al.
2005/0192717 A1 9/2005 Tafs et al.
2005/0203675 A1 9/2005 Griffin et al.
2005/0222721 A1 10/2005 Chen et al.
2005/0228674 A1 10/2005 Gunn et al.
2005/0231390 A1 10/2005 Crane et al.

OTHER PUBLICATIONS

McCann, R.S., et al., "Enhancing Taxi Performance Under Low Visibility: Are Moving Maps Enough?" Paper Presenting at the Human Factors and Ergonomics Society 41st Annual Meeting, 1997, Santa Monica, CA.

Andre, A.D. "Information Requirements for Low–Visibility Taxi Operations: What Pilots Say." 8th International Symposium on Aviation Psychology, 1995, Columbus, OH.

McCann, R. S., Andre, A. D., Begault, D., Foyle, D. D., & Wenzel, E. (1997), E. (1997). Enhancing taxi performance underlow visibility: are moving maps enough? Paper presentedd at the Human Factors and Ergonomics Society 41st Annual Meeting, Santa Monica, CA.

McCann, R. S., Andre, A. D., Foyle, D. C., & Battiste, V. (1996). Advanced navigation aids in the flight deck: Effects on ground taxi performance under low visibility conditions. Paper presented at eh World Aviation Congress, Los Angeles, CA.

Batson V.M. et al., "Navigating the Airport Surface: Electronic vs. Paper Maps," AIAA/IEEE Digital Avionics Systems Conference, 13th DASC, Phoenix, AZ, USA Oct. 30–Nov. 3, 1994, pp. 515–520, XP001012787, 1994, New York, NY, USA, IEEE, USA ISBN–0–7803–2425–0, pp. 517, right–hand column, Paragraph 1.

Hutchins, Edwin, "The Integrated Mode Management Interface," Final report for grant #NCC 2–591 from the Ames Research Center of the National Aeronautices and Space Administration in the Aviation Society/Automation Program, pp. 1–50 and Appendixes 1–5.

Jones, D.R. et al., "Airport Surface Movement Technologies, Atlanta Demonstration Overview," Proceedings of 17th Digital Avionics Systems Conference, Bellevue, WA USA<Oct. 31–Nov. 7, 1998, pp. F–21/1–10, vol. 2, New York, NY, USA, IEEE, USA. ISGN:0–7803–5086–3, pp. F21/6–7.

Jones, D.R., et al., "Flight Demonstration of Integrated Airport Surface Automation Concepts," Proceedings of the 14th Digital Avionics Systems Conference, Cambridge, MA, USA, Nov. 5–9, 1995, pp. 77–82, XP002241831, 1995, New York, NY, USA<IEEE, USA. ISBN:0–7803–3050–1, p. 79, left–hand column, Paragraph 1, p. 79, right hand column, paragraph 3, figure 2.

Lindenfeld, Ron, "What is an FMS?" <http://www.ultranet.com/~marzgold/FAQ–FMS.html>, Accessed Jun. 3, 2002, pp. 1–5.

McCann, R.S. et al. "Advanced Navigation Aids in the Flight Deck: Effects on Ground Taxi Performance Under Low Visibility Conditions." Paper Presented at the World Aviation Congress, 1996, Los Angeles, CA.

Theunissen, E. et al. "Design and Evaluation of Taxi Navigation Displays." Paper presented at the Proceeding of the 21st Digital Avionics Systems Conference, 2002, Irvine, CA.

* cited by examiner

METHOD AND SYSTEM FOR ENTERING AND DISPLAYING GROUND TAXI INSTRUCTIONS

Matter enclosed in heavy brackets [ ] appears in the original patent but forms no part of this reissue specification; matter printed in italics indicates the additions made by reissue.

*CROSS-REFERENCE TO RELATED APPLICATION*

*This patent application is a reissue application for commonly assigned U.S. Pat. No. 7,222,017, issued from U.S. patent application Ser. No. 10/870,630, filed on Jun. 17, 2004.*

FIELD OF THE INVENTION

The invention is generally related to systems and methods for tracking and planning vehicle movement, and specifically to airport map displays and to the entry and display of ground taxi routes.

BACKGROUND

As the air travel system becomes saturated, airports are becoming more and more congested. At the busiest airports, it is not uncommon to have 50 or more aircraft taxiing to and from multiple active runways using complex routes involving many different taxiways. System capacity is at or near saturation even during good weather conditions. Ground taxi can add over one hour to travel time for any particular flight. Efficient, flexible and adaptive ground operations are essential to enhancing air travel performance. This is especially true during poor weather conditions. As visibility drops, the number of aircraft that can operate at a given airport decreases rapidly and those aircraft still operating must slow down so as not to miss a turn or a hold short point, or taxi across an active runway without clearance.

A variety of methods are currently in use for aircrews to navigate on the ground. Most of these methods involve receiving verbal instructions from air traffic control, writing them down and interpreting those instructions by looking at a paper map of the airport. To effectively use such methods, the pilot must direct attention from outside the aircraft to inside the aircraft, and simultaneously transition from verbal instructions to a visual interpretation of those instructions while looking at a paper airport diagram. During low visibility, the aircrew loses their ability to use forward and peripheral vision because ground references and other airport traffic become harder to see, forcing the aircrew to concentrate their attention outside the aircraft to ensure safe operations. Recently, some devices have enabled aircrews to electronically display and orient the airport map and even show the aircraft position on the map; however, entry and display of taxi route information could be enhanced. The invention is directed to overcoming one or more of the problems or disadvantages associated with the prior art.

SUMMARY

According to one aspect of the invention, a method of entering and displaying ground movement instructions for a vehicle may include loading an electronic database of map data into an onboard computer. Entry of ground movement instructions into the onboard computer may be made by entering a series of ground movement segments. Each ground movement segment may be automatically checked for continuity with a previous segment, a subsequent segment, an initial vehicle position or a vehicle destination. An electronic map showing an area of operation for the vehicle may be displayed. Vehicle position data may be acquired and displayed on the electronic map and updated according to vehicle movement. Ground movement segments may be graphically and/or alphanumerically displayed on the electronic map and updated according to vehicle movement.

According to another aspect of the invention, a system for the entry, recall and/or display of ground movement instructions for a vehicle may include an electronic entry device, an electronic output device, a computer, an electronic database and a position determining device. The computer may contain a software program which analyzes ground movement segments for continuity and ensures that each ground movement segment connects with adjacent segments, an initial vehicle position and/or a destination. The invention may facilitate the speed and accuracy of the entry of ground movement instructions. Alternatively, the system may store preloaded taxi routes for recall. These preloaded taxi routes may be constructed manually by the aircrew, or downloaded from air traffic control through a data link. This system may be simulated on a desktop computer for training purposes.

The system and method according to one aspect of the invention facilitate aircraft ground movement route entry through a user entered series of ground movement segments, and check each segment by ensuring each segment is continuous with the currently selected segment, an adjoining initial position and/or an adjoining destination. The system may separately display the segments that are continuous or otherwise join with the currently selected segment (the currently selected segment may be either the last entered segment or the last selected segment). Speed and accuracy of ground movement segment entry may be enhanced by allowing the pilot to quickly locate the next possible segments. An embodiment of the invention automatically pans and zooms the display as ground movement segments are entered to center on and fully show the last entered segment and its intersection with all possible next segments, thereby reducing the amount of manual panning and zooming that might otherwise be required.

The features, functions, and advantages can be achieved independently in various embodiments of the present invention or may be combined in yet other embodiments.

DETAILED DESCRIPTION

An embodiment of the invention may have at least two different entry interface options; menu and graphical. As will be discussed in further detail when referring to the figures, the menu interface option allows the user to make an entry by selecting a predisplayed softkey. Softkeys are selectable areas on the input/output display screen 124 (FIG. 4) that are available for activation by the user to make various inputs. The softkeys may be areas on the input/output display screen 124 which look like keys on a keyboard.

The graphical interface allows the user to make an entry by directly touching the segment on the map, or by placing a cursor on the segment, and confirming the selection by selecting the corresponding softkey generated by the computer with the cursor. As the user makes a selection, the system 20 automatically pans and zooms the display so as to fully display the last selected segment and its intersection(s) with any segment(s) that join the last selected segment. This prevents the user from having to pan and zoom the display manually to find the next segment. In addition, when the user makes a selection, the system 20 may automatically position the cursor in the menu or graphical interface in such a way as to facilitate the next selection by minimizing cursor movement to the next selection.

In the menu interface, the user selects segments from a set of softkeys, each of which represent an individual ground movement segment. The user may select the softkeys by either touching them, or placing the cursor over them and selecting the softkey with the cursor control device. The user has the option of selecting segments from a menu which may only display ground movement segments which join with the currently selected ground movement segment, an initial vehicle position and/or a vehicle destination. Alternatively, either the graphical or menu interface may be configured so as to allow creation and storage of taxi routes for recall. For example, Air Traffic Control may predefine a taxi route at an airport; the predefined taxi route may be stored in the system memory and recalled by the user, thereby accelerating the entry process.

Figure 1:
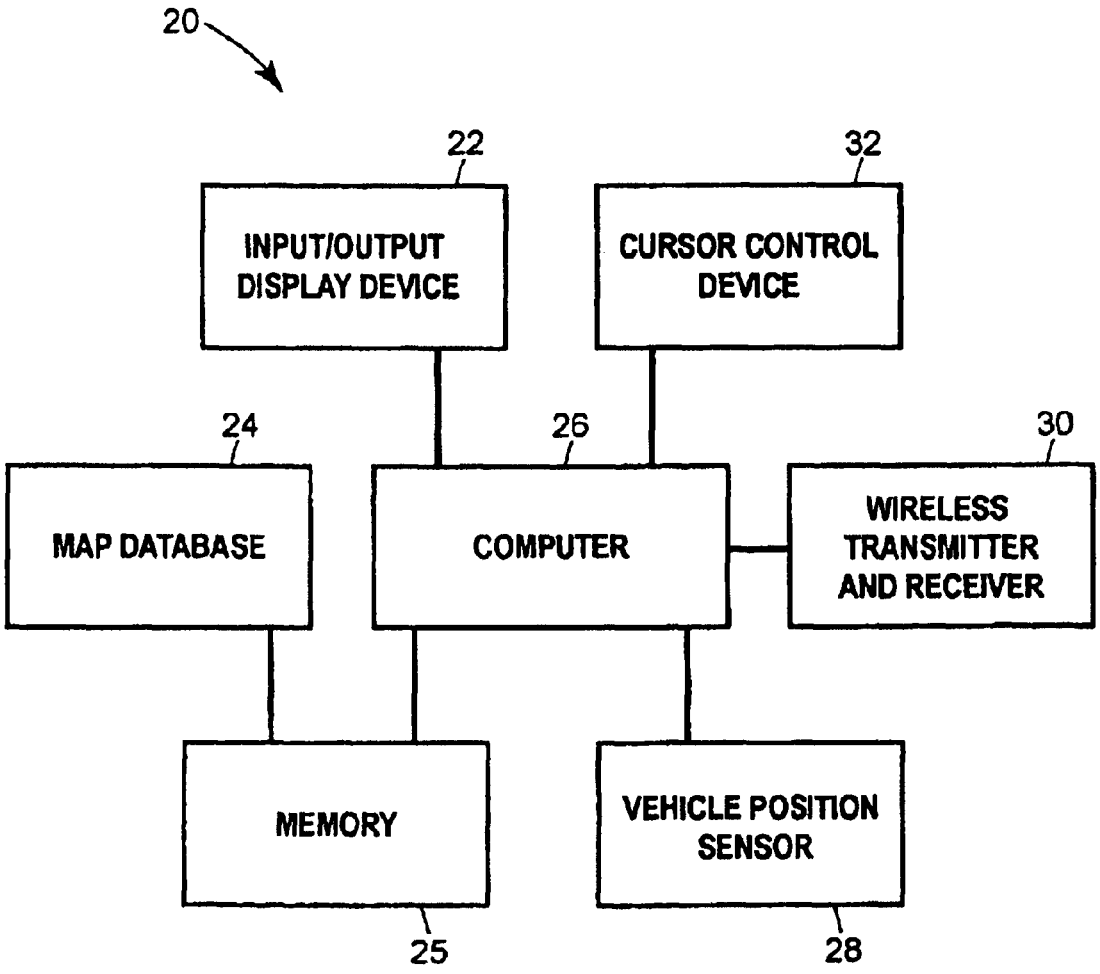
FIG. 1 is a schematic diagram of an advantageous embodiment of the system components according to the invention.

Referring to FIG. 1, a system 20 is provided for entering and displaying ground taxi instructions including a computer 26 for the processing of data and generation of displays. One or more input/output devices 22 may be linked to the computer 26 and used to enter data for the computer 26. The input/output devices 22 may be combined into a single device such as, for example, a touchscreen. Alternatively, the input/output devices 22 may be separate, and/or one or both input/output devices 22 may be incorporated into existing aircraft displays. The input/output devices 22 may be any one of a cathode ray tube (CRT) display, a liquid crystal display (LCD), a head up display (HUD), plasma display, rear projection display, or any other suitable display device. Speech recognition and/or datalink may be used as input methods if desired.

An electronic map database 24 may be resident in a memory 25 of the computer 26 and may be updatable. The electronic map database 24 may contain multiple airport layouts including, but not limited to, runways, taxiways, terminal and other permanent structures, parking locations, and run-up locations. An example of one such a database is Jeppesen's Electronic Flight Bag Airport Map.

A vehicle position sensor 28 may be used to supply the computer 26 with vehicle position information. The vehicle position sensor may include one or more of, a Global Positioning System (GPS), an inertial navigation system (INS), a terrestrial based navigation system (such as VOR or TACAN), and/or a manually input starting or current position. The computer 26 may be configured to receive position data from any other aircraft system (i.e., the flight management computer, the autopilot, etc.).

A transmitter/receiver 30 for the wireless transmittal and receipt of data may be connected to the computer 26 for data transfer between the aircraft and external sources. This data may include taxi instructions from Air Traffic Control (ATC), position data, Notices to Airmen (NOTAMs), runway/taxiway information, weather information, delay information, information from a dispatcher and/or any other type of data suitable for wireless transmittal/receipt. A cursor control device 32, such as a keyboard, a mouse, a touchpad, a joystick, or any other device suitable for controlling a cursor may be connected to the computer 26.

Figure 2:
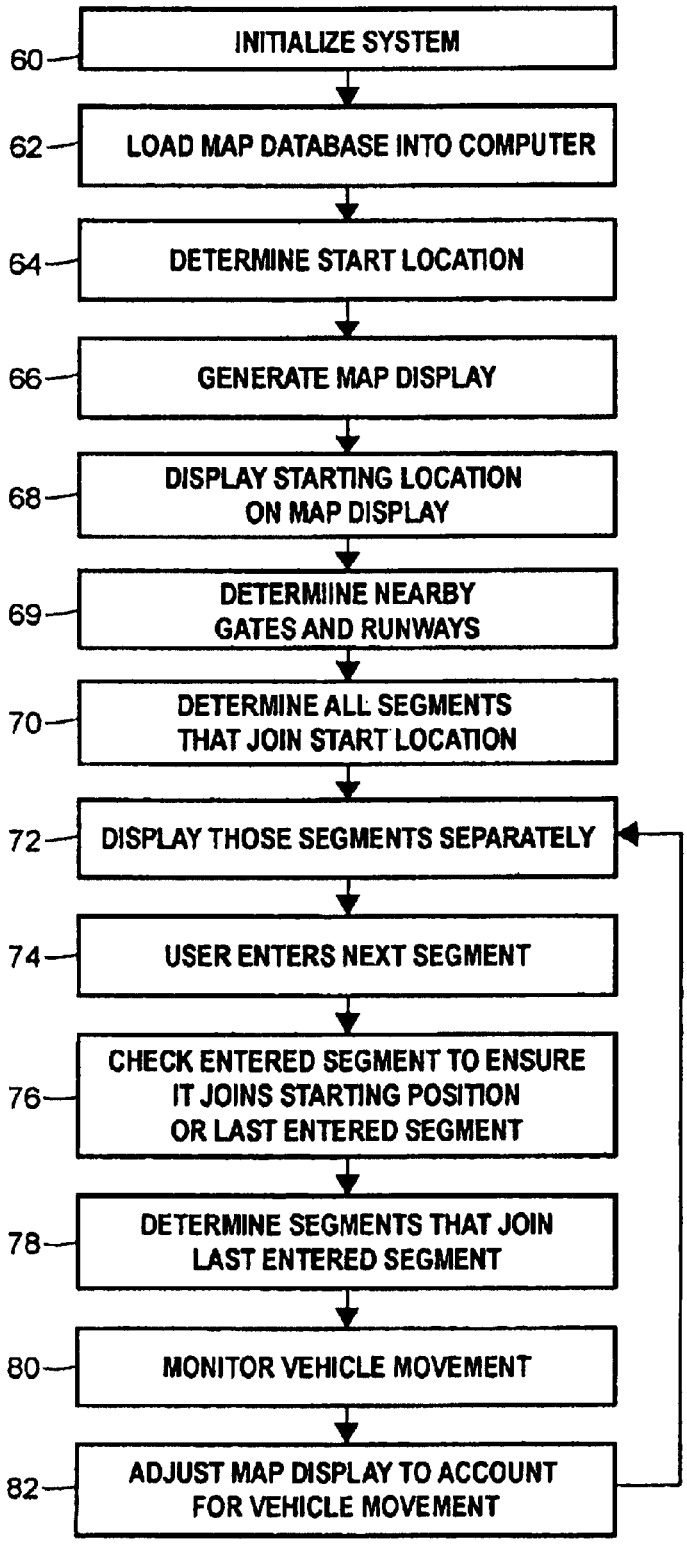
FIG. 2 depicts an implementation of the method of displaying ground movement instructions and checking user inputs for accuracy in one advantageous embodiment of the invention.

FIG. 2 shows one embodiment of an implementation of displaying ground movement instructions and checking user input for accuracy. The first operation at 60 is to initialize the system 20. This may be done when the aircraft is powered up. The map database 24 may be loaded at 62 when needed, such as, for example, when the map database 24 changes or is improved. Once loaded, the map database 24 remains in the system 20 until updated or deleted. The system 20 keeps at least the last two versions of the map database 24 in memory, allowing the user to switch to a previous map database 24 should a current map database 24 become corrupt or unusable. This feature enables the user to load a new version of the map database 24 before it becomes active and switch the map database 24 at a changeover date.

The aircraft starting location may be determined at 64. This may be accomplished many different ways. For example, one or more of a Global Positioning System (GPS), an inertial navigation system (INS), a terrestrial based navigation system, retrieval from another aircraft system, such as a Flight Management Computer (FMC) and a manually input starting position may be used to determine the aircraft starting location.

The computer 26 generates the map display, as shown at 66, using the map database 24 and displays the map and the starting position, as shown at 68, on the input/output device 22. The system 20 determines the current gate or runway, and/or nearby gates and/or runways at 69 by analyzing the map database 24 for all gates and/or runways within a predefined distance of the aircraft starting location. Those gates and/or runways may be displayed for selection. At 70, the system 20 determines all segments that join the starting position. Alternatively, if the user selects a gate or runway as a starting point, the system 20 determines all segments that join the selected gate or runway as shown at 70. Segments that join the starting position may be determined by analyzing all segments for points in common with the starting position. The joining segments may be displayed separately, as shown at 72, on the input/output device 22 for user selection.

The user may select the next segment, as shown at 74, for example by touching the selection on the screen, or by positioning a cursor over the selection and activating it. The selected segment may be checked at 76 to ensure that it joins the previous segment and may be annunciated if the selected segment does not join the previous segment. The annunciation may be visual, tactile and/or aural cue. The process may be repeated for the next segment, as shown at 78. If a selection is entered between two previously entered segments, the selected segment may be checked at 76 to ensure that it joins the previous and subsequent segments and may be annunciated if the selected segment does not join both adjacent segments. The system 20 monitors aircraft movement, as shown at 80, and may update the map display and taxi instructions to account for movement of the vehicle as indicated at 82.

Figure 3:
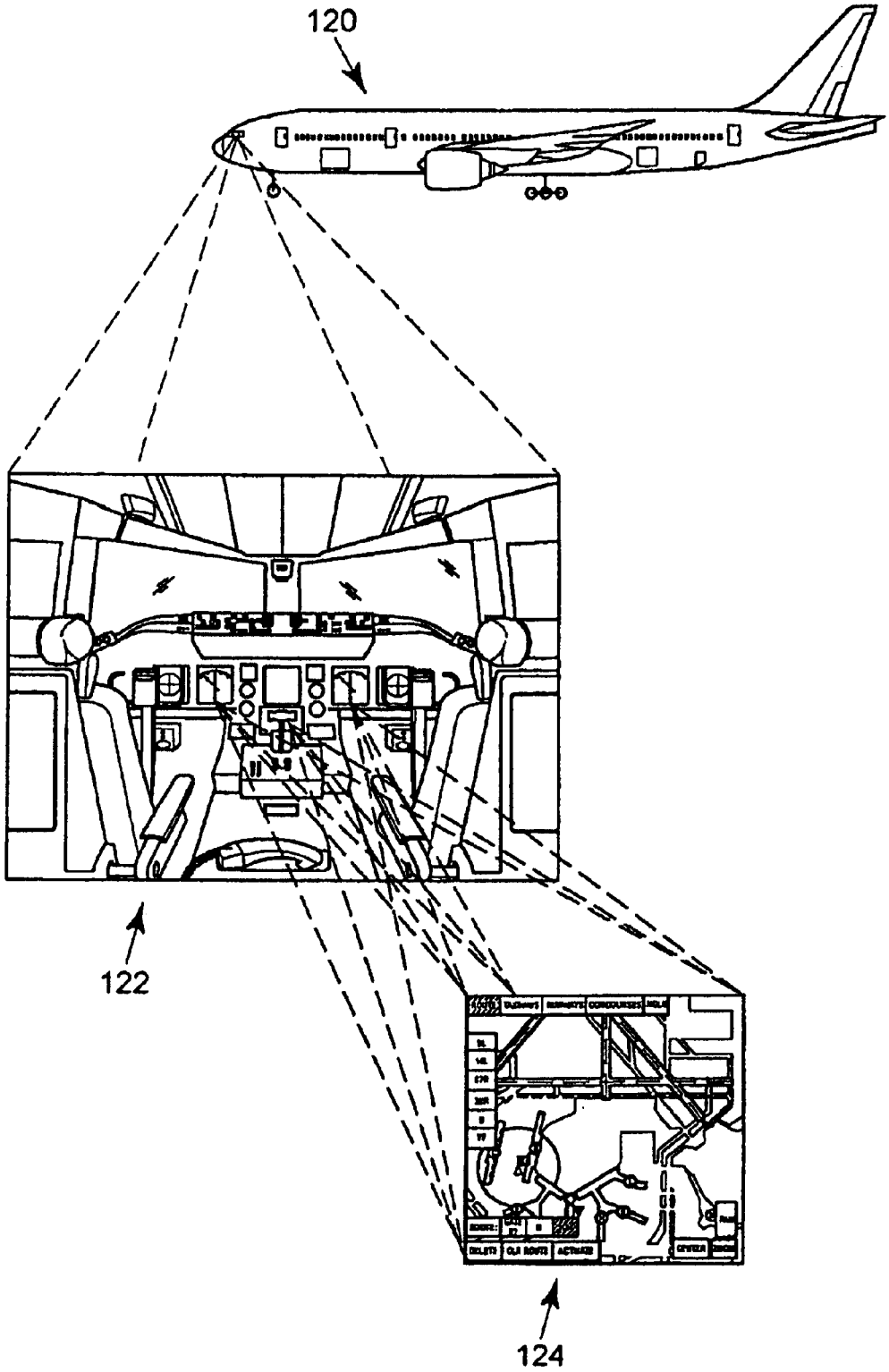
FIG. 3 represents several possible input/output device locations in an aircraft of an advantageous embodiment of the invention.

FIG. 3 shows three of several possible positions of the input/output device 124, on an aircraft 120. The input/output display device 124 may be located in a cockpit 122 of the aircraft 120. Although this drawing shows that the input/output display device 124 may be mounted in any one or more of multiple locations on an instrument panel of the cockpit 122, the input/output display device 124 may be mounted in any one or more other locations within the cockpit 122 which are convenient for the pilots and where space is available. The input/output display device 124 may be incorporated into existing aircraft systems and displays; it may also include a stand-alone system.

Figure 4:
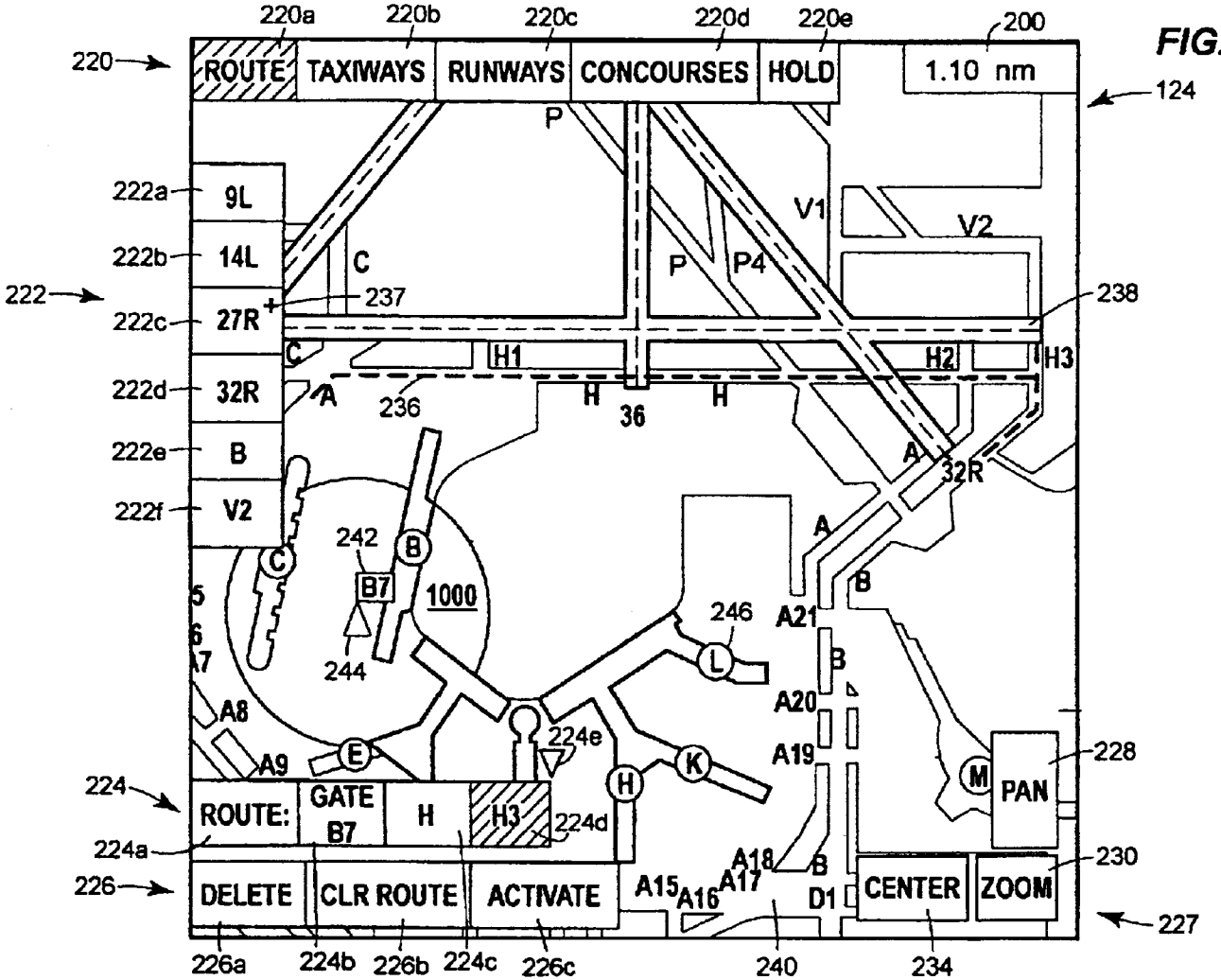
FIG. 4 represents an advantageous embodiment of an input/output device in a menu interface mode.

FIG. 4 shows one embodiment of the input/output display device 124 operating in a menu interface mode. The input/output display device 124 displays a map (in FIG. 4, a map of O'Hare International Airport is shown), and also may simultaneously display a main menu 220 and sub-menus 222 as softkeys. At the top right of the display is a display scale 200. The scale may be displayed in nautical miles, kilometers, statute miles, or any other suitable unit of distance.

Working counterclockwise around FIG. 4, the main menu 220 provides Main menu softkeys 220a–e that may be activated by the user to select the type of segments for entry (i.e., Runways, Taxiways, Concourses, or Hold). A shaded softkey may represent an active selection as 220a shows. The pilot may make a selection in the menu mode in a plurality of ways, two of which are touching the softkey, with or without an instrument to facilitate the selection, or placing the cursor over a softkey and selecting it with the cursor control device 32. A Route softkey 220a on the Main menu 220 may select an intelligent entry feature on either the menu interface or the graphical interface. Selecting intelligent entry instructs the computer 26 to determine possible route segments that join the currently selected route; segment and display separately those possible route segments as individual softkeys on the map so that the user may select from those possibilities that join the currently selected route segment, starting position or destination. In the menu mode, segments that join the currently selected segment 224d may be displayed as softkeys 222a–f along the left side of the input/output display device 124 when the Route softkey 220a is selected.

When the Route softkey 220a is selected in the graphical mode, the segments that do not join the currently selected segment may be disabled for selection, allowing only the graphical selection of segments that join the currently selected segment. An alternative embodiment of intelligent entry in the graphical mode comprises highlighting all segments and/or displaying all associated softkeys for segments which join the currently selected segment. Another alternate embodiment comprises displaying a list of all segments that join the currently selected segment, similar to the menu interface, and selecting a segment for entry directly from the list. This may also be accomplished by graphically highlighting the map segment selected from the list and displaying the associated segment softkey in the map area near the segment.

Sub-menus 222 and sub-sub-menus 223 (FIG. 6), may be displayed when more information is needed. A small square on the taxiway sub-menu 222 softkey "H" 222a indicates that there is a sub-sub-menu available. Alternatively, an asterisk indicates a sub-sub-menu, containing a partial taxiway set, is available which displays only those ground movement segments which join the current segment. One instance in which sub-sub-menus may be employed is in the case of taxiway identifiers with subsets (H, H1, H2, etc.) 223a, 223b, 223c, or numerically identical runway identifiers With right, left, center, or any other alphanumerical designations. A Runways softkey 22c may display sub-menus for all runways for a given airport. A Taxiways softkey 22b may display sub-menus for all taxiways for a given airport. A Concourses softkey 220d may display sub-menus for all the gates and/or parking locations at a given airport.

Selecting the Hold softkey 220e allows the user to input at least one hold short instruction. Aircraft crossing of a hold short point may be annunciated. The annunciation may be a visual, tactile and/or aural cue.

A Route sub-menu 222 may show runways and taxiways available (222a, b, c, d, e) that connect with the currently selected ground movement segment. A Route display in the lower left-hand corner of the input/output display device 124 of FIG. 4 may show a taxi route as entered with a shaded softkey 224d showing the currently selected segment. The associated inverted triangle 224e shown above the top right corner of 224d indicates the insertion point for the next entry. The segment softkeys (224b, c, d) show what ground movement segments have been entered. A Route Action menu 226 in the lower left-hand corner of the screen allows the user to delete a segment 226a, clear the entire route 226b, or activate the current taxi route 226c. During taxi, route softkeys 224 in the activated route may show taxi progress through variable shading or highlighting of completed segments, the current segment, and upcoming segments.

In the lower right-hand corner of the input/output display device 124 is a View menu 227. A Center softkey 234 toggles a display center between ownship position and a center of the last selected segment or manual pan. A Zoom softkey 230 allows the user to change the scale of the displayed map. The system 20 may automatically declutter the symbology on the display by using an impingement algorithm. Each symbol may be assigned a location and an area on the screen, and as the scale decreases and symbol areas begin to overlap, the software program may selectively remove certain symbols based on a preprogrammed priority. This removes excess clutter and makes the display easier to read. The system 20 incorporates a manually activated simultaneous pan and zoom feature called local area zoom. When the user "double taps" the input/output display device, similar to double clicking the mouse on a desktop computer, the system 20 may automatically increase the magnification by a preset amount and center the magnified display on the point the user double tapped. The same local area zoom feature can be selected by placing the cursor at a point and tapping or otherwise activating the cursor control device twice rapidly in succession. In both touch and cursor implementations, a subsequent "double tap" restores the display center and scale to that which existed before the local area zoom was activated. A Pan softkey 228 allows the user to pan the display in the selected direction in order to see some map feature and/or more of the taxi route without zooming the map scale out to a larger scale.

Figure 5:
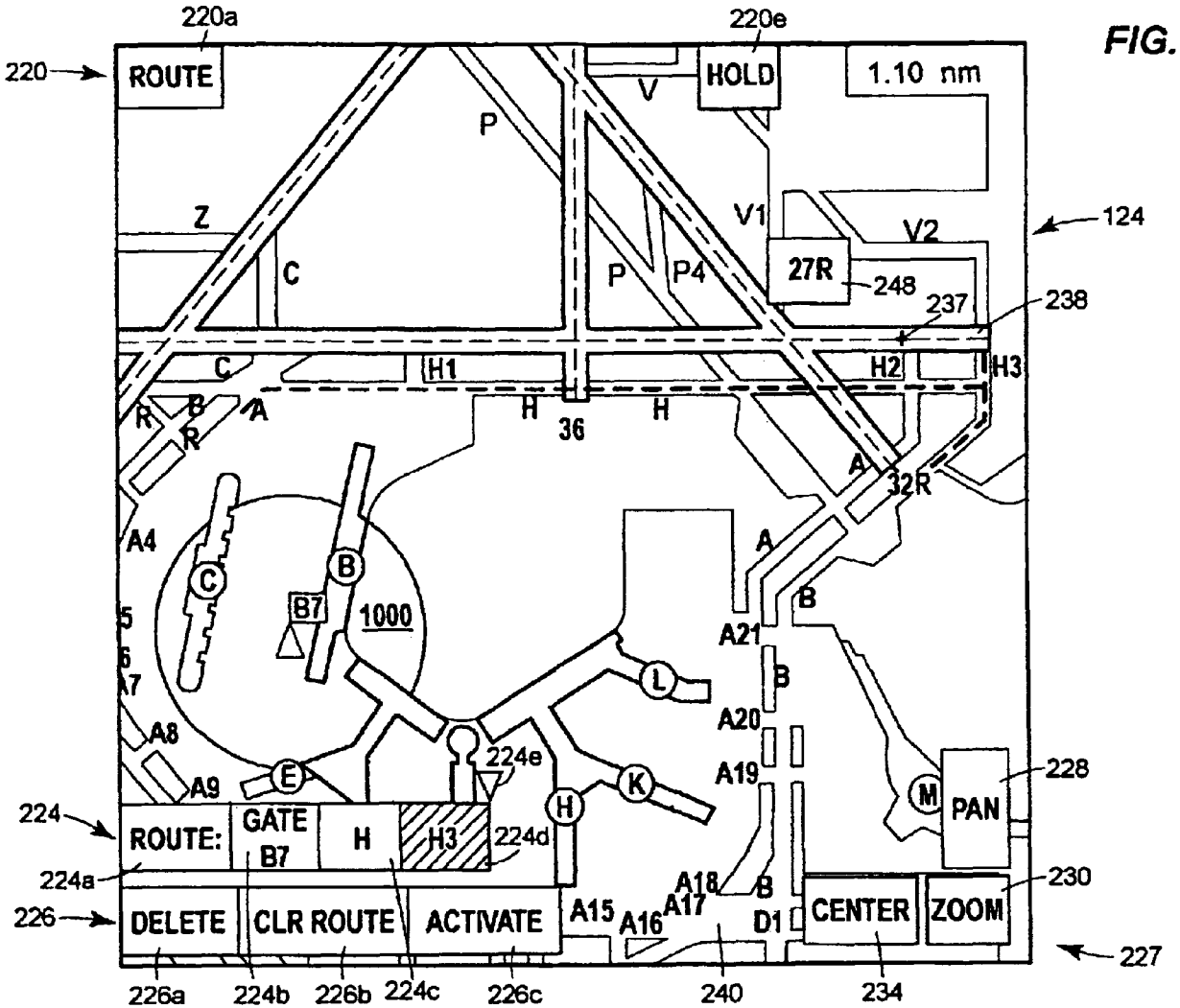
FIG. 5 represents an advantageous embodiment of an input/output device in a graphical interface mode.
Figure 6:
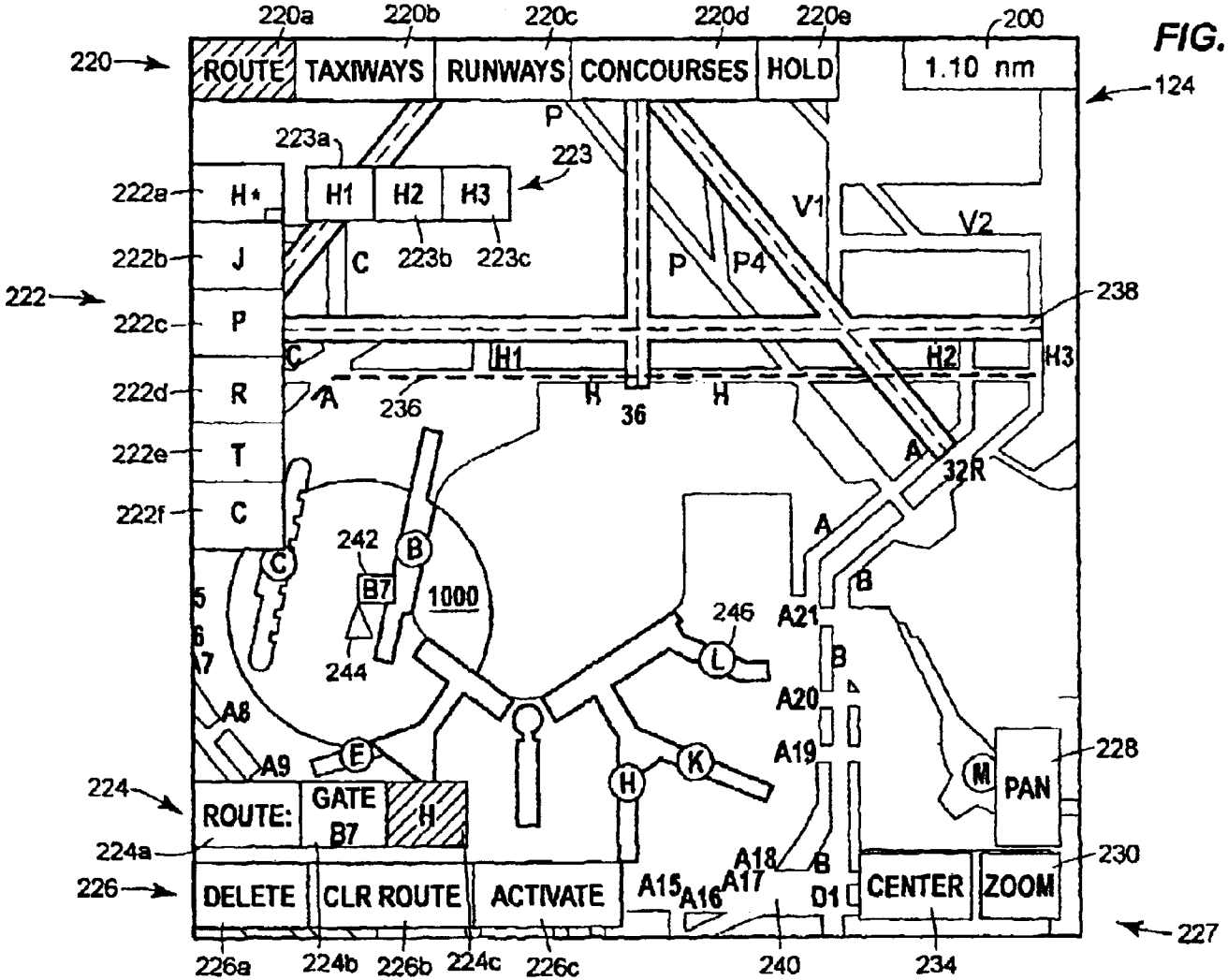
FIG. 6 represents an advantageous embodiment of an input/output device in a menu interface mode, showing submenus and sub-sub-menus

As shown in FIGS. 4–6, the taxi route as entered may be graphically displayed on the airport map as a dashed line 236 while in the entry mode and this line may turn solid when the route is activated. The route line may be color coded consistent with Flight Deck design philosophy. Runways 238 and taxiways 240 may be displayed, the runways 238 may be outlined and have centerline stripes. An aircraft assigned or selected gate location 242 may be shown. An aircraft ownship position 244 may also be shown. Concourses 246, or any other logical grouping of gates and/or parking locations, may be shown and labeled with identifiers. The menu interface map display may be user selected as either north up, a static/fixed map with moving (rotating and translating) ownship position symbol 244, or heading up, a moving map (rotating and translating) with static/fixed ownship position symbol 244. Aircrew situational awareness may be enhanced by displaying the ownship position 244, the taxi route 236, and the airport map on the display 124. The cursor 237 may be symbolically represented as any appropriate symbol, such as, for example, a small cross on the screen, and may be controlled through the cursor control device 32.

FIG. 5 depicts a display of the input/output device 124 in the graphical interface mode. The graphical interface mode may have many of the same features as the menu interface mode. For example, the map portion of the display and the Zoom, Pan, Center and Route Action functions may be identical to that of the menu interface mode. The difference may be in the entry areas, for example. Instead of selecting a predisplayed softkey for entry, the user may directly select the gate, taxiway, or runway itself by touching it, or placing the cursor over it and selecting with the cursor control device 32. The graphical interface mode may include a softkey 248 for a selection entry/confirmation. The gate, taxiway or runway softkey may appear in close proximity to the selected gate, runway or taxiway on the map when the gate, taxiway or runway is selected by touch or cursor. In this case, the softkey 248 for runway 27R is displayed just to the north of runway 27R. The user makes the selection by touching the softkey or placing the cursor over the softkey and selecting with the cursor control device 32. In some cases, the computer may preposition the cursor to facilitate entry. One example may be when the Activate softkey 226c is selected, the cursor may be prepositioned on an Execute softkey to save the user from having to move the cursor to the Execute softkey. The graphical interface mode may be user selected as either north up, static/fixed map with moving (rotating and translating) ownship position symbol 244, or heading up, moving map (rotating and translating) with a static/fixed ownship position symbol 244.

In an alternate embodiment of the graphical interface entry, the route may be entered as a series of discrete sub-segments (i.e. short dashed lines or dots) collocated with the map segment. These sub-segments may appear/display when the route sub-segment is touched or the cursor is moved/passes over the sub-segment in the approximate direction of the overall segment. In this alternate embodiment, which may differ for touch or cursor interface, the segment identifier may be displayed in the alphanumeric route line once some predetermined number of sub-segments are graphically displayed or selected. Sub-segments may be removed from the display by deleting the segment identifier from the alphanumeric route line, or by touching or passing the cursor over the displayed sub-segment.

Logical filtering and sub-segment display thresholds may be implemented to prevent unwanted nuisance display of, or deletion of sub-segments the cursor may pass over or which may be inadvertently touched. Selection of the displayed sub-segment and/or entry of the associated identifier in the alphanumeric route line may require positive confirmation such as, for example, cursor select switch activation. This alternate embodiment of graphical interface route entry may be facilitated by logic which automatically connects displayed sub-segments of joined segments. Thus a least one sub-segment per segment may be entered. Automatic connection of sub-segments eliminates the need for the user to connect sub-segments in adjacent segments which join one another, thus speeding up route entry.

FIG. 6 is a display of the menu mode showing the display of the sub-sub-menus 223 on the left side of the screen. The sub-sub menus 223 may appear if needed and may stay displayed until the user makes a selection.

Although the preferred embodiments of the invention have been disclosed for illustrative purposes, those skilled in the art will appreciate that various modifications, additions and substitutions are possible, without departing from the scope and spirit of the invention as disclosed herein and in the accompanying claims. For example, other embodiments may include systems and methods according to the invention for use in connection with vehicles other than aircraft, such as automobiles, ships, mining vehicles, agricultural equipment, construction equipment, or any other vehicle capable of movement on, above, or below the surface of the earth.

What is claimed is:

1. A system for entry and display of at least one ground movement route for a vehicle, comprising:

an electronic entry device for entry of a series of ground movement segments, the electronic entry device including a graphical interface that allows a user to select the ground movement segments from an electronically displayed map, wherein said entry device is operatively connected to an output device;

a computer operatively connected to said electronic entry device and said output device, wherein said computer contains [a software program which analyzes each] *instructions programming the computer to analyze individual* ground movement [segment] *segments* in said series of a ground movement segments and [ensures] *ensure* that [each said] *the individual* ground movement [segment joins] *segments join* at least one of the following[,]*:* a previous segment, a subsequent segment, an initial vehicle position and a vehicle destination, and which automatically pans said electronically displayed map to center on at least one of a currently selected ground movement segment, said initial vehicle position and said vehicle destination;

an electronic database including map data that can be accessed by said computer and used to generate the electronically displayed map; and a position determining device coupled to said computer.

2. A system according to claim 1, wherein said electronic entry device is at least one of a liquid crystal display (LCD), a cathode ray tube (CRT), a plasma display and a rear projection display.

3. A system according to claim 1, wherein said electronic entry device includes a touchscreen.

4. A system according to claim 1, wherein said position determining device includes at least one of a Global Positioning System (GPS), an inertial navigation system (INS), another aircraft system, a terrestrial based navigation system, and a manually input position.

5. A system according to claim 1, wherein said electronic entry device further includes a keyboard.

6. A system according to claim 1, wherein said electronic entry device further includes a cursor and a cursor control device.

7. A system according to claim 1, wherein said electronic entry device further includes speech recognition.

8. A system according to claim 1, wherein said electronic entry device uses a menu display for entry of said ground movement segments.

9. A system according to claim 1, wherein said system automatically changes the scale of said output device, to at least fully display a currently selected ground movement segment and intersections with said possible successive ground movement segments.

10. A system according to claim 1, wherein said output device separately displays ground movement segments that join at least one of, said previously entered ground movement segment, said subsequent ground movement segment, said initial vehicle position and said vehicle destination.

11. A system according to claim 10, wherein said system automatically pans said electronically displayed map to include at least one intersection with at least one of said previous ground movement segment, said initial vehicle position and said vehicle destination.

12. A system according to claim 11, wherein said system automatically pans said electronically displayed map to center on said currently selected ground movement segment and at least one of said previous ground movement segment, said initial vehicle position and said vehicle destination.

13. A system according to claim 12, wherein said system automatically pans said electronically displayed map to center on an intersection of at least two of, a last entered ground movement segment, a last selected ground movement segment, and said previous segment.

14. A system according to claim 1, further comprising a simultaneous pan and zoom feature.

15. A system according to claim 1, further comprising a transmitter and receiver for the wireless transmittal and receipt of data.

16. A system according to claim 1, wherein said electronic database includes predefined ground movement routes.

17. A system according to claim 1, wherein said electronic entry device is adapted to facilitate at least one of creation, storage and recall of ground movement segment routes.

18. A system according to claim 1, wherein said output device is at least one of, a cathode ray tube (CRT) type display, a liquid crystal (LCD) type display, a head-up (HUD) type display, a plasma display and a rear projection display.

19. A system according to claim 1, wherein said electronic entry device and said output device are simulated on a desktop computer.

*20. A system according to claim 1, wherein the instructions program the computer to analyze the individual ground movement segments in the series of ground movement segments after the individual ground movement segments have been selected by the user.*

* * * * *